United States Patent Office 3,360,864
Patented Jan. 2, 1968

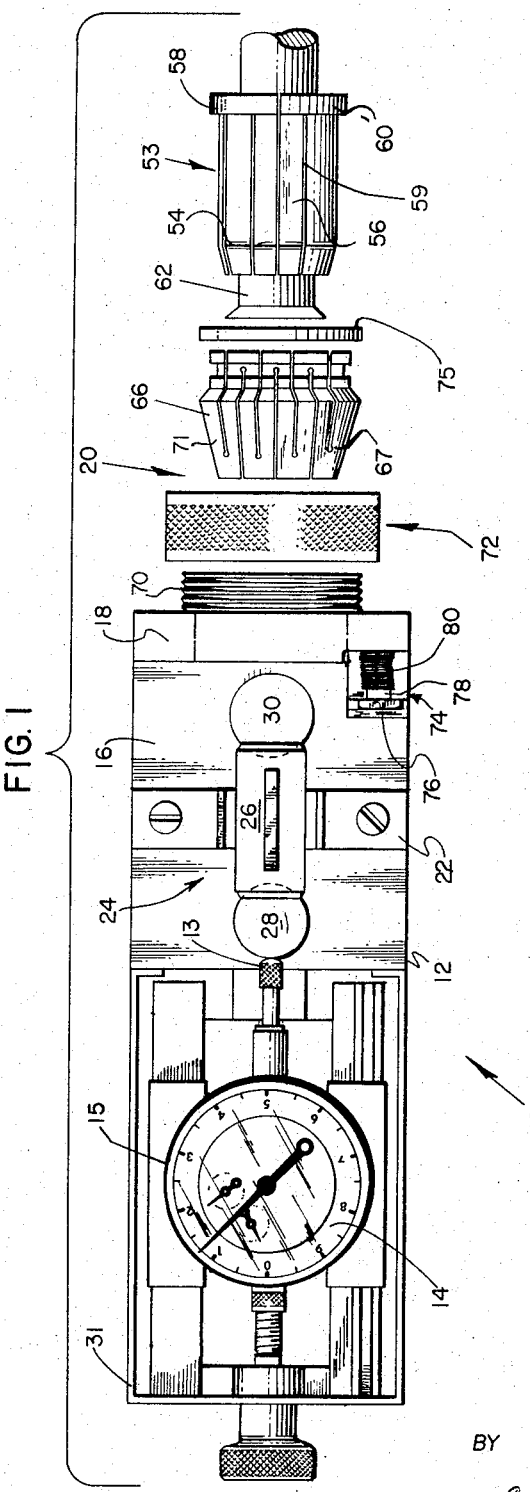

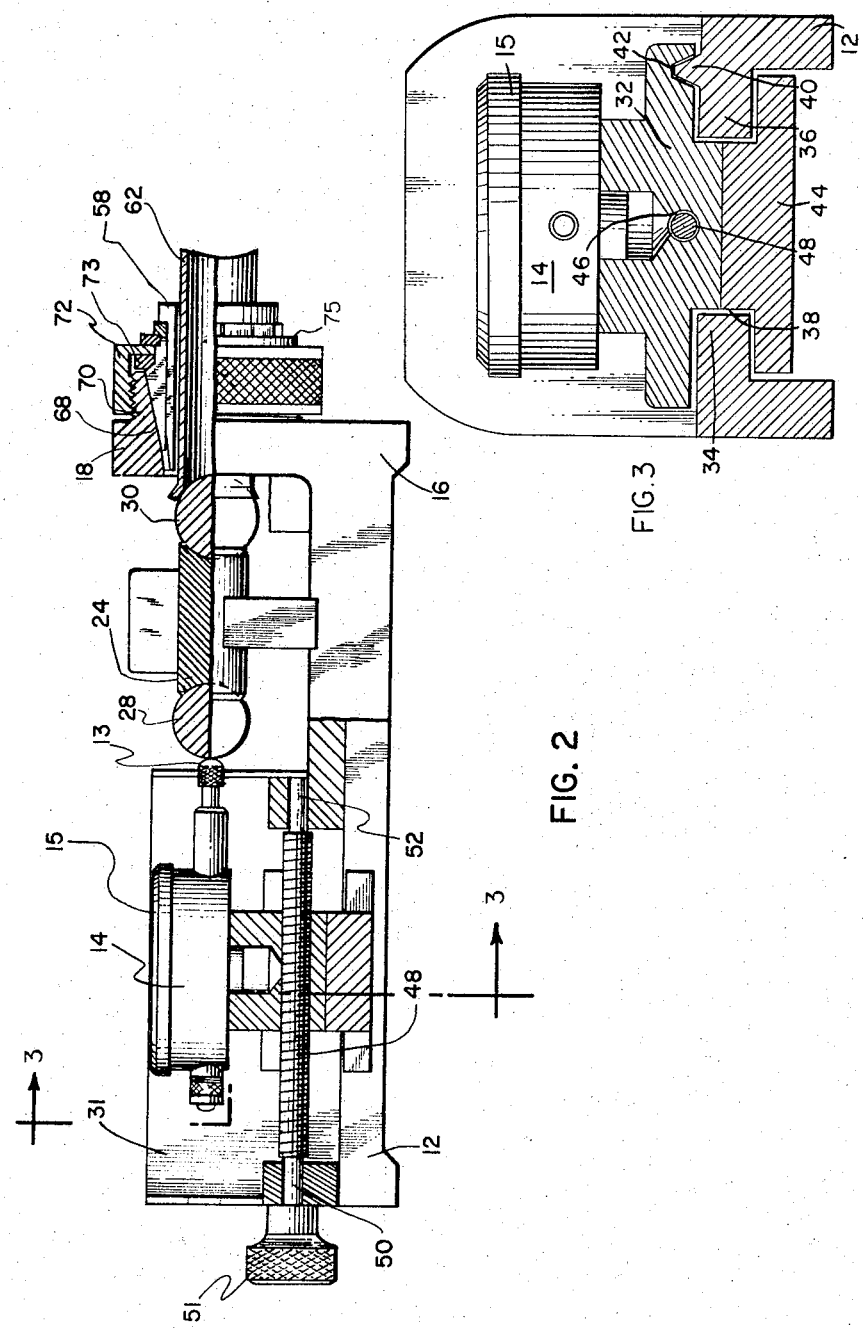

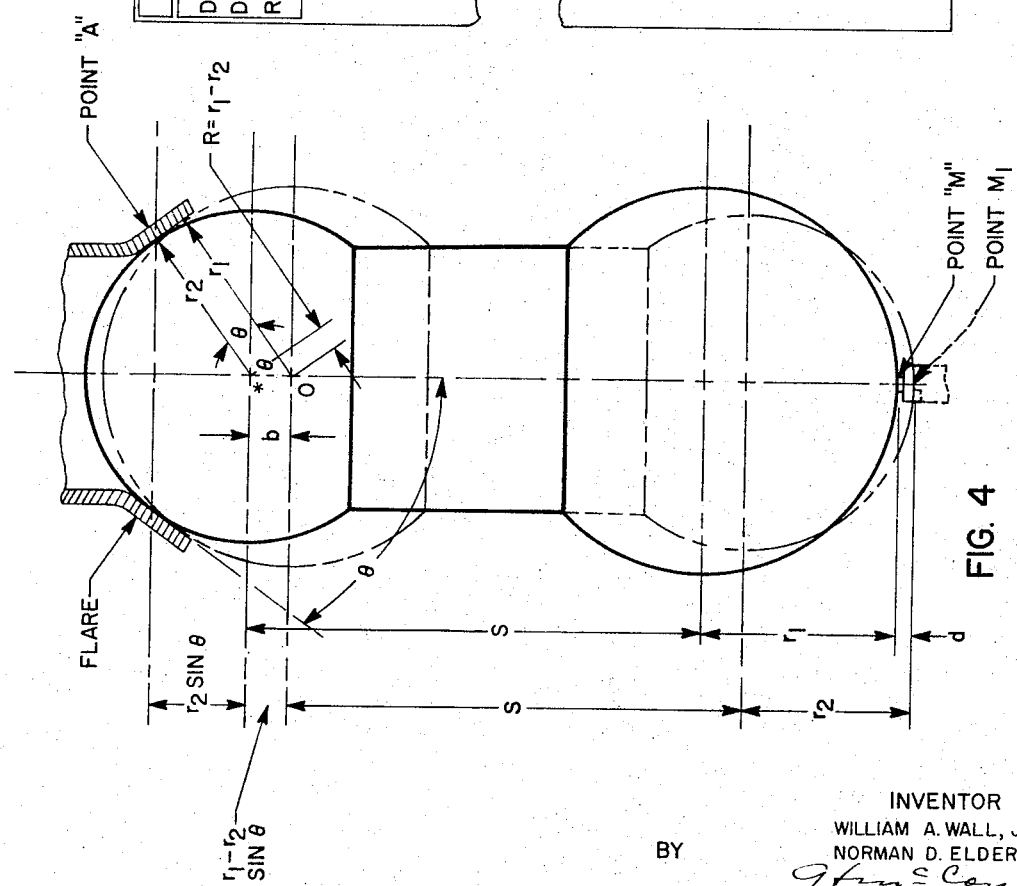

3,360,864
INTERNAL FLARE ANGLE GAUGE
Norman D. Elder, Tampa, Fla., and William A. Wall, Jr., Huntsville, Ala., assignors to the United States of America as represented by the Administrator of the National Aeronautics and Space Administration
Filed June 2, 1967, Ser. No. 644,446
8 Claims. (Cl. 33—174)

ABSTRACT OF THE DISCLOSURE

A gauge for measuring the internal angle of a flare on the end of a tube including a base; a tube holding means mounted on one end of the base, a plunger actuated dial indicator on the other end, and a support block mounted therebetween. The gauge includes a differential ball device comprising a short shaft having a sphere attached to each end thereof, one of the spheres being larger than the other. The shaft is positioned on the support block such that one sphere abuts the tube flare and the other sphere abuts the dial indicator plunger. The gauge should include a plurality of differential ball devices to permit the gauging of various tube sizes.

Background of the invention

The invention described herein may be manufactured and used by or for the Government of the United States of America for governmental purposes without the payment of any royalties thereon or therefor.

This invention relates in general to gauges for measuring or checking tapered dimensions. More particularly, the invention relates to a device for measuring the internal angle of a flare on the end of a tube.

Flared tubing is used in great quantities in the fabrication and testing of space vehicles, both in the flight vehicle itself and in ground support equipment therefor. Tube joints made with these flared tube ends must, for obvious reasons, be free of any leakage, contamination or other defects. In order to assure that such joints are sound it is necessary to maintain strict quality control of the internal flare angle. Methods and apparatus available heretofore for checking tube flares were not completely satisfactory in that the equipment lacked versatility, was not sufficiently accurate, or was so bulky and complex that use was limited to a local area.

Summary of the invention

The invention described herein provides an internal flare angle gauge which overcomes the disadvantages mentioned above. The gauge is accurate, portable, and sufficiently simple in operation to permit a relatively unskilled operator to quickly and accurately inspect a newly formed flare on the end of a tube. Large quantities of flared tubings are used in the hydraulic and pneumatic lines found in space vehicles and the simplicity of operation and portability of the invention is important in that the gauge can be used in a fabrication area or it can be transported for use in checking tube flares in place on a space vehicle. A gauge constructed in accordance with this invention includes a collet means for securely positioning a flared tube in a position to be gauged, a differential ball device, an anvil on which the ball device rests during use of the gauge, and a plunger actuated dial indicator. All of these components are mounted and aligned upon a base member. The differential ball device includes a pair of precision balls, one smaller than the other, that are attached to the ends of a relatively short shaft or rod. In operation, with the flared tube securely positioned, the smaller ball of the differential ball device is positioned in the flare of the tube and the dial indicator is run up against the other or larger ball of the differential ball device. The dial indicator is then set to zero. After setting the dial indicator at zero, the operator then switches the ball device so that the large end is inserted into the flared end of the tube and the small end of the ball device is in contact with the dial indicator. In the reversed position the large end of the ball will not seat as deeply into the flared end of the tube as will the smaller ball. Thus, the movable plunger on the dial indicator will be displaced by an amount equal to the difference in the seating position of the large and small balls. Plunger displacement is of course indicated by the dial indicator. Appropriate calculations can be made with the values obtained by measuring the displacement of the dial indicator plunger and the radii of the balls on the end of the ball device. In practice, tables are prepared wherein the displacement read from the dial indicator can be used to find the internal flare angle directly.

The many advantages and objects of the invention will become more apparent after considering the following detailed description in conjunction with the drawings described below.

Brief description of the drawings

FIGURE 1 is a plan view of the invention with the tube holding collet shown in an exploded form.

FIGURE 2 is a side view, partially in section, of the instrument shown in FIGURE 1.

FIGURE 3 is an end view, partially in section, taken along lines 3—3 of FIGURE 2.

FIGURE 4 is a diagram illustrating distances and angles used in the mathematical derivation that demonstrates the principle on which the invention operates.

FIGURE 5 is a sample table illustrative of types of tables which can be prepared and used with the invention.

Detailed description

Referring now to FIGURE 1, a gauge 10 is shown having a base 12 upon which a dial indicator 14 is adjustably and slidably mounted. The dial indicator includes a plunger 13 and can be adjusted to read zero by rotation of dial indicator face 15. One end 16 of the base member includes an upstanding section 18 in which an adjustable diameter collet device 20 is mounted (see FIGURE 2). A V-block or anvil 22 is attached by screws or other suitable means to the base set at a position intermediate the dial indicator and adjustable collet. A differential ball device 24, consisting of a short shaft 26 having one precision ball 28 attached to one end thereof and a larger precision ball 30 attached to the other end thereof, is positioned on and supported by the anvil. The precision balls are attached to the shaft by any suitable means, one of which is silver soldering. The dial indicator is protected by a fence or guard 31 mounted on each side thereof.

It will be seen in FIGURE 3 that the dial indicator is mounted to a support block 32 which slides upon inwardly extending portions 34 and 36 of base 12 and also extends into an aperture 38 formed in base 12. The base also includes an upstanding guiderail 40 which fits into guide slot 42 formed in block 32 to maintain the alignment of the dial indicator as it is adjusted with respect to the base in a manner discussed hereafter. A second block 44 is attached to body 32 and functions to retain dial indicator 14 and block 32 in a proper position with respect to the base. Block 32 has a threaded aperture 46 formed therein which accommodates a threaded shaft or screw 48 which is journaled, see FIGURE 2, at ends 50 and 52 thereof, in base member 12. End 50 of the threaded screw has a knurled knob 51 affixed thereto for rotating the screw 48 to adjust the position of the dial indicator with respect to base 12.

Adjustable collet means 20 comprises a first adjustable diameter collet 53 consisting of a pair of semi-cylindrical members 54 and 56 having rims 58 and 60 formed integral therewith. The semi-cylindrical members are sized so as to be a fairly close fit when mounted in place around tube 62. Semi-cylindrical members 54 and 56 have longitudinal slits 59 formed therein to permit compression of the cylindrical members against tube 62 by cylindrical body 66 which also has longitudinal slits 67 formed therein to permit compression thereof and thus a reduction in diameter. Body 66 includes a tapered surface 71 which abuts against a tapered bore 68 (see FIGURE 2) formed in the upstanding section 18 of base 12. Section 18 also includes a skirt-like portion 70 having exterior threads formed thereon which mates with internal threads formed in a collar 72. A self centering flange 73 is positioned between collar 72 and body 66. When the collet is assembled in the manner shown in FIGURE 2, and collar 72 is threaded onto the skirt-like portion, continued tightening of collar 72 will result in the cylindrical body 66 being compressed by bore 68 and body 66 will in turn compress semi-cylindrical members 54 and 56 against tube 62 and thus secure tube 62 in a position where the flared end thereof can be gauged. A snap ring 74 is provided that snaps into groove 75 in body 66. The snap ring is engaged by collar 70 when the collar is loosened to result in removal of body 66 from bore 68.

A tube stop is provided for assuring that the tube to be checked is properly positioned for each check and thus avoids unnecessary adjustment of the dial indicator. The tube stop is composed of a stop lever or arm 76 pivotally mounted to a rotatable shaft 78. The stop lever is normally biased to a vertical position by a torsion spring 80 mounted around shaft 78. When a tube is being positioned for checking the operator of the gauge manually depresses the stop lever to a position where it will abut the tube. When released the stop lever will pivot back to a vertical position.

The operation of the invention is as follows. The semi-cylindrical members making up collet 53 are positioned around the end of the tube to be checked and then inserted into cylindrical member 66 held in place in bore 68 by collar 70. Collet 53 must be made in two parts to clear the flared end of the tube. Collar 72 is positioned as shown in FIGURE 2. The adjustable collet assembly is in position within bore 68 and tube 62 is run up against the tube stop lever. Collar 72 is tightened so as to securely clamp the tube 62 into position. A differential ball device of suitable size is then placed into position on the anvil 22 so that the small sphere 28 abuts the tube flare and the large sphere 30 is adjacent the plunger of the dial indicator. The position of the dial indicator is then adjusted by rotation of knurled knob 51 so that the plunger of the dial indicator barely contacts sphere 30. The dial indicator is then set to read zero by rotating the dial face. The differential ball device is then rotated so that the large sphere abuts the tube flare and the small sphere is against the plunger of the dial indicator. It is readily apparent that the large ball will not seat in the flare as deeply as did the small sphere and thus the plunger of the dial indicator will be displaced, which displacement will be registered on the face of the dial indicator.

Referring now to FIGURE 4 of the drawing, which is used to illustrate the mathematical derivation discussed hereafter that demonstrates and explains the principles of operation of the invention. FIGURE 4 shows in solid line a differential ball device with the small sphere of the ball gauge in the tube flare having a flare angle $\theta$. The reversed position with the large sphere in the tube flare is shown in dotted line. The vertical distance from point A where the spheres contact the tube flare to the point M where the large sphere shown in solid line first contacts the plunger of the dial indicator can be expressed as follows:

$$AM = r_2 \sin \theta + s + r_1 \quad (1)$$

The distance from point A to the point $M_1$, the point where the small sphere contacts the dial indicator plunger when the differential ball device has been reversed, as shown in dotted line in FIGURE 4, can be written as follows:

$$AM_1 = r_2 \sin \theta + \frac{(r_1 - r_2)}{\sin \theta} + s + r_2 \quad (2)$$

From inspection of FIGURE 4 and consideration of the relationships set forth above, it is apparent that the distance the dial indicator plunger is displaced by reversal of the differential ball device is equal to the distance $AM_1 - AM$, which can be expressed as follows:

$$d = AM_1 - AM \quad (3)$$

Substituting Equations 1 and 2 into Equation 3 the following equations are obtained:

$$d = r_2 \sin \theta + \frac{(r_1 - r_2)}{\sin \theta} + s + r_2 - (r_2 \sin \theta + s + r_1)$$

$$d = r_2 \sin \theta + \frac{(r_1 - r_2)}{\sin \theta} + s + r_2 - r_2 \sin \theta - s - r_1$$

and by cancelling and combining terms an equation $$d = \frac{r_1 - r_2}{\sin \theta} - (r_1 - r_2)$$

is obtained which can be used to prepare a table from which the flare angle data can be obtained by using the displacement indicated by the dial indicator. A sample of such a table is shown in FIGURE 5 and it will be apparent from a consideration thereof that the flare angle can be obtained directly from the displacement indicated by the dial indicator.

A preferred exemplary embodiment of the invention has been described herein, however, it will be apparent to those skilled in the art to which this invention pertains that many changes and modifications may be made without departing from the spirit and scope of the invention as defined in the claims appended hereto. For example, the gauge can be made to accommodate various tube sizes by merely including several differential ball devices having calibrated spheres attached thereto which are of a suitable size for the tube size it is desired to gauge. Also, it will be necessary to include several sets of the semi-cylindrical bodies 54 and 56 having varying internal diameters to accommodate various tube sizes. In addition, reference tables must be provided for each size of differential ball device used. Since the dial indicator is adjustable along the length of the base and is also capable of being set to zero, one dial indicator will suffice for many tube sizes.

What is claimed is:

1. A gauge for measuring the internal angle of a flare on the end of a tube comprising:
   (a) a rectangular base;
   (b) an indicating device mounted on said base and having a plunger and means for measuring and indicating displacement of the plunger;
   (c) holding means mounted on the other end of said base for holding a tube in a fixed position with the flared end thereof opening toward said indicating device;
   (d) a support block mounted on said base between said holding means and said indicating device;
   (e) a differential ball member that includes a shaft having a sphere attached to each end thereof, one sphere being larger than the other;
   (f) said shaft being adapted to rest on said support block in a position wherein one sphere enters into and abuts the flared end of the tube and the other sphere abuts the plunger of said indicating device whereby rotation of said ball member to reverse the position of said spheres will result in a displacement of the plunger that is indicative of the internal flare angle size.

2. The gauge recited in claim 1 wherein said indicating device is movably mounted on said base for adjustment of the distance between the indicating device and the tube holding means.

3. The gauge recited in claim 2 wherein said tube holding means includes:
(a) an upstanding section attached to said base having an opening formed therein whose center is in alignment with the plunger of said indicating device;
(b) a pair of semi-cylindrical bodies having longtudinal slits formed therein and a rim on one end thereof, said bodies being sized so as to be a close fit around a tube to be gauged;
(c) an adjustable means adapted to be mounted in said opening that fits over and compresses the pair of semi-cylindrical bodies against the tube when said collet means is secured in the opening formed in said upstanding section of said base.

4. The gauge recited in claim 3 wherein said indicating device is a plunger actuated dial indicator.

5. A gauge for measuring the internal angle of a flare formed on the end of a tube comprising:
(a) a base;
(b) a tube holding means mounted on one end of said base;
(c) a displacement indicating means mounted on the other end of said base;
(d) a support block attached to said base in a position between said displacement indicating means and said tube holding means;
(e) a differential ball member that includes a first sphere attached to one end of a short shaft and a second sphere attached to the other end of the shaft, said first sphere being larger in diameter than said second sphere;
(f) said ball member being positioned on said support block so that said second sphere is in the flared end of the tube and the second sphere is in engagement with the displacement indicating means; whereby, reversal of said ball member so that said first ball is located in the tube flare and said second ball is in engagement with the displacement indicating means to register a displacement that can be translated into the internal tube flare angle.

6. A gauge as recited in claim 5 wherein:
(a) said displacement indicating means is movably mounted with respect to said base to accommodate various size ball members to permit the gauging of various tube sizes.

7. A gauge as recited in claim 6 wherein:
(a) the spheres on said differential ball members are precision ground to an exact diameter and silver soldered to the short shaft.

8. A gauge as recited in claim 7 wherein:
(a) said displacement indicating means is a plunger actuated dial indicator, and
(b) said dial indicator is mounted on a threaded shaft journaled for rotation in the base so as to permit adjustment of the dial indicator with respect to the base.

References Cited

UNITED STATES PATENTS 1,118,587  11/1914  Schaum.
3,115,705  12/1963  Whiteman.

FOREIGN PATENTS 298,630  6/1917  Germany.

SAMUEL S. MATTHEWS, *Primary Examiner.*